Nov. 12, 1946.　　　T. O. MEHAN　　　2,411,050
CALCULATING MACHINE
Filed Dec. 23, 1940　　　10 Sheets-Sheet 8

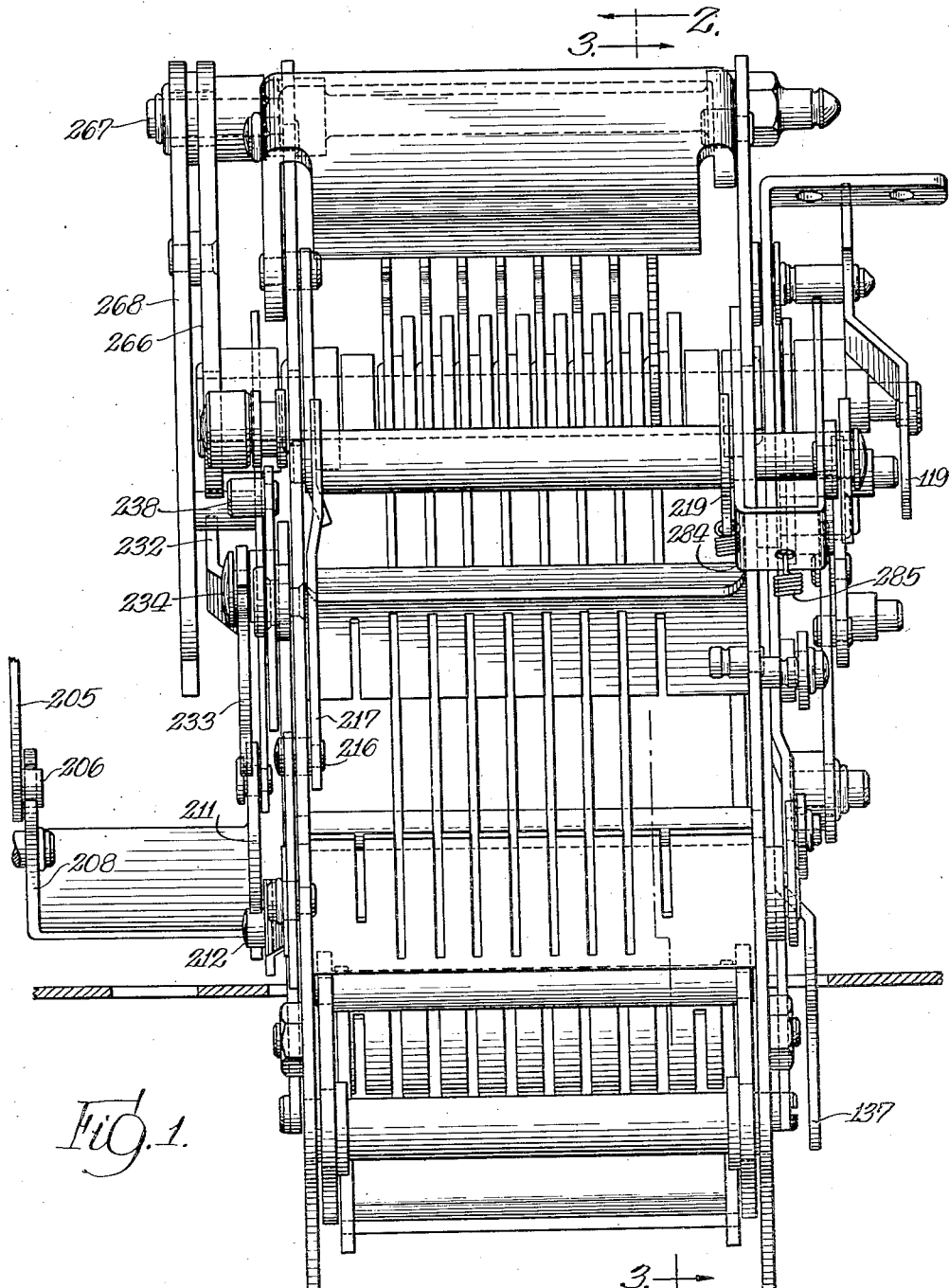

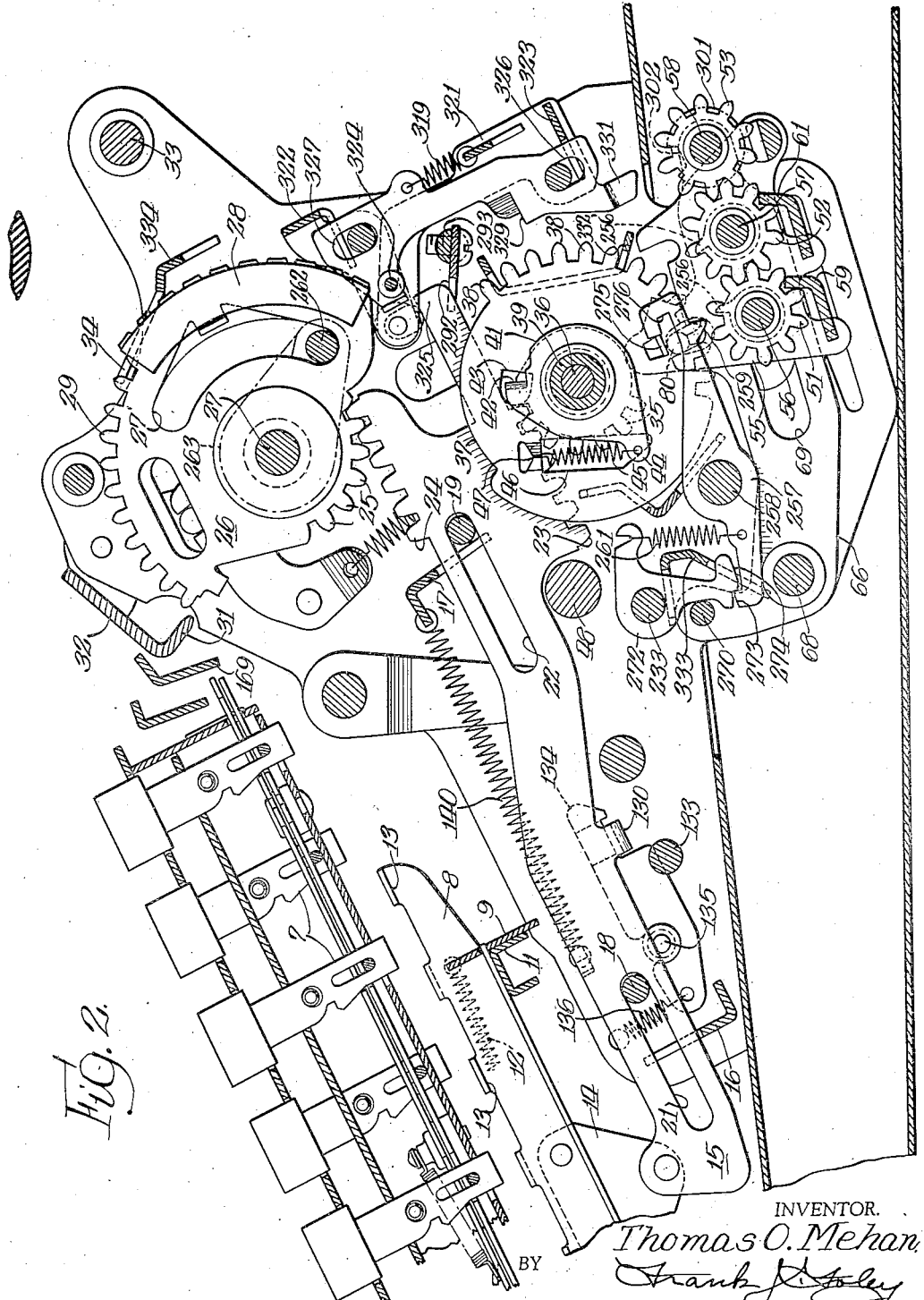

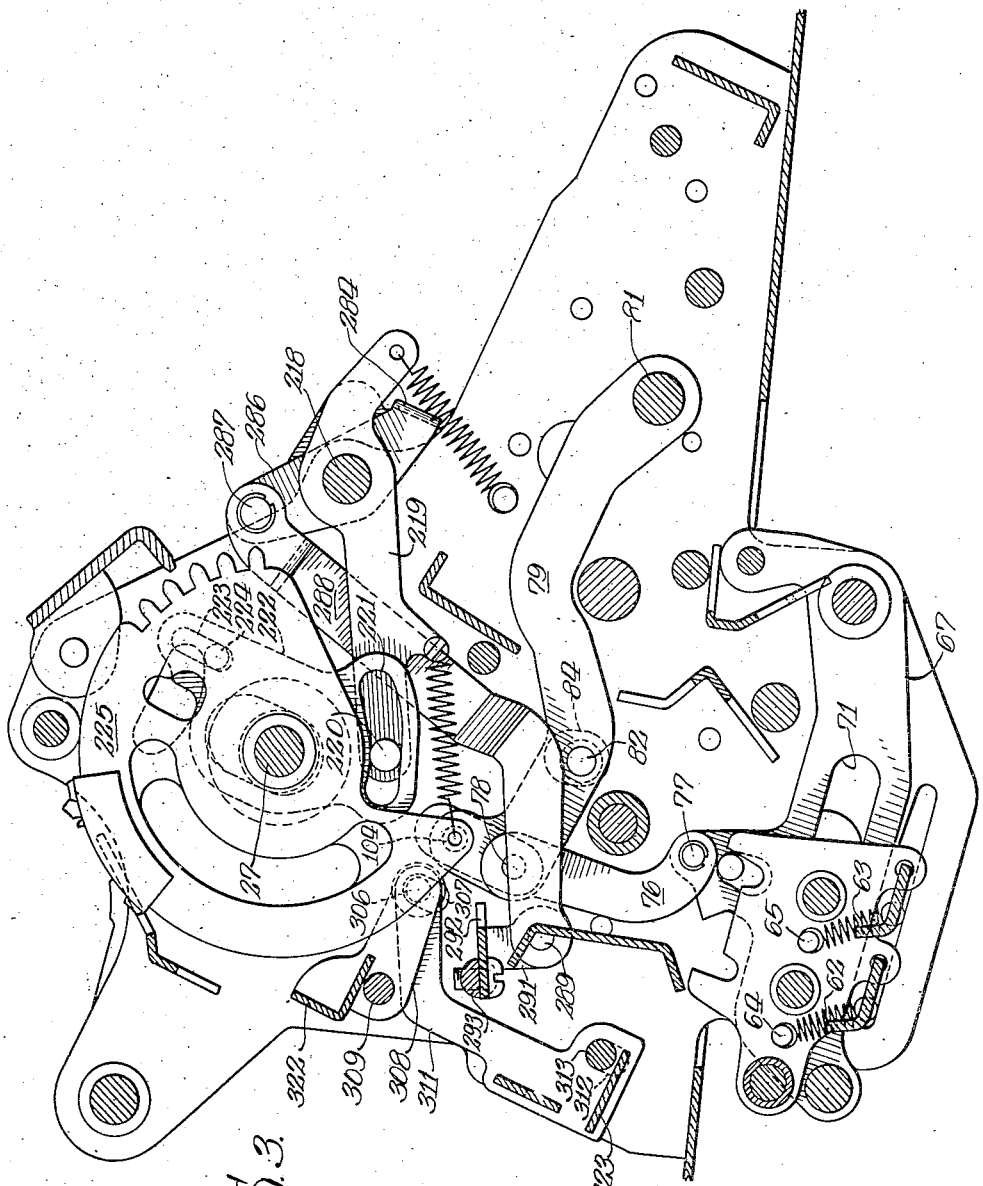

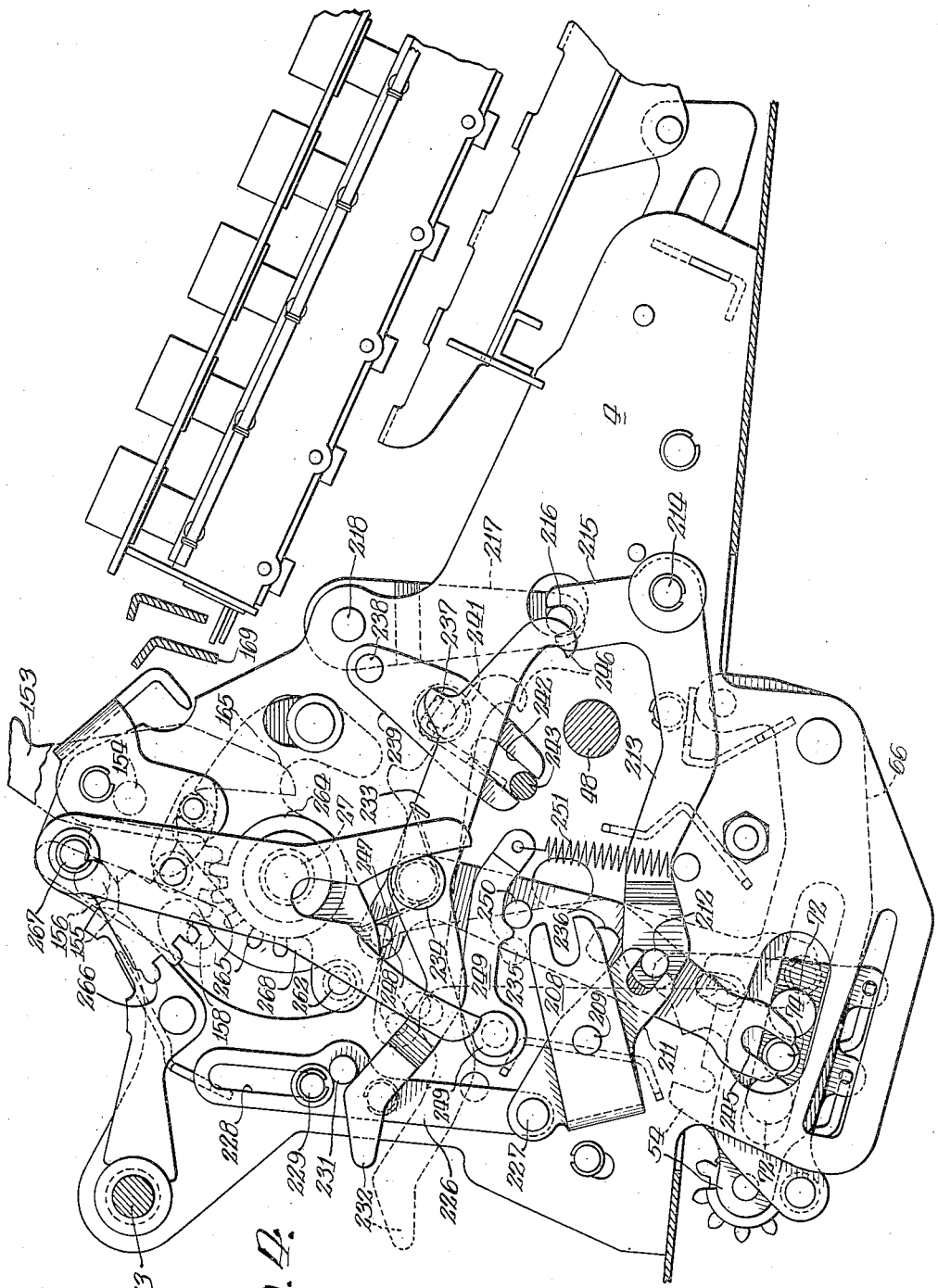

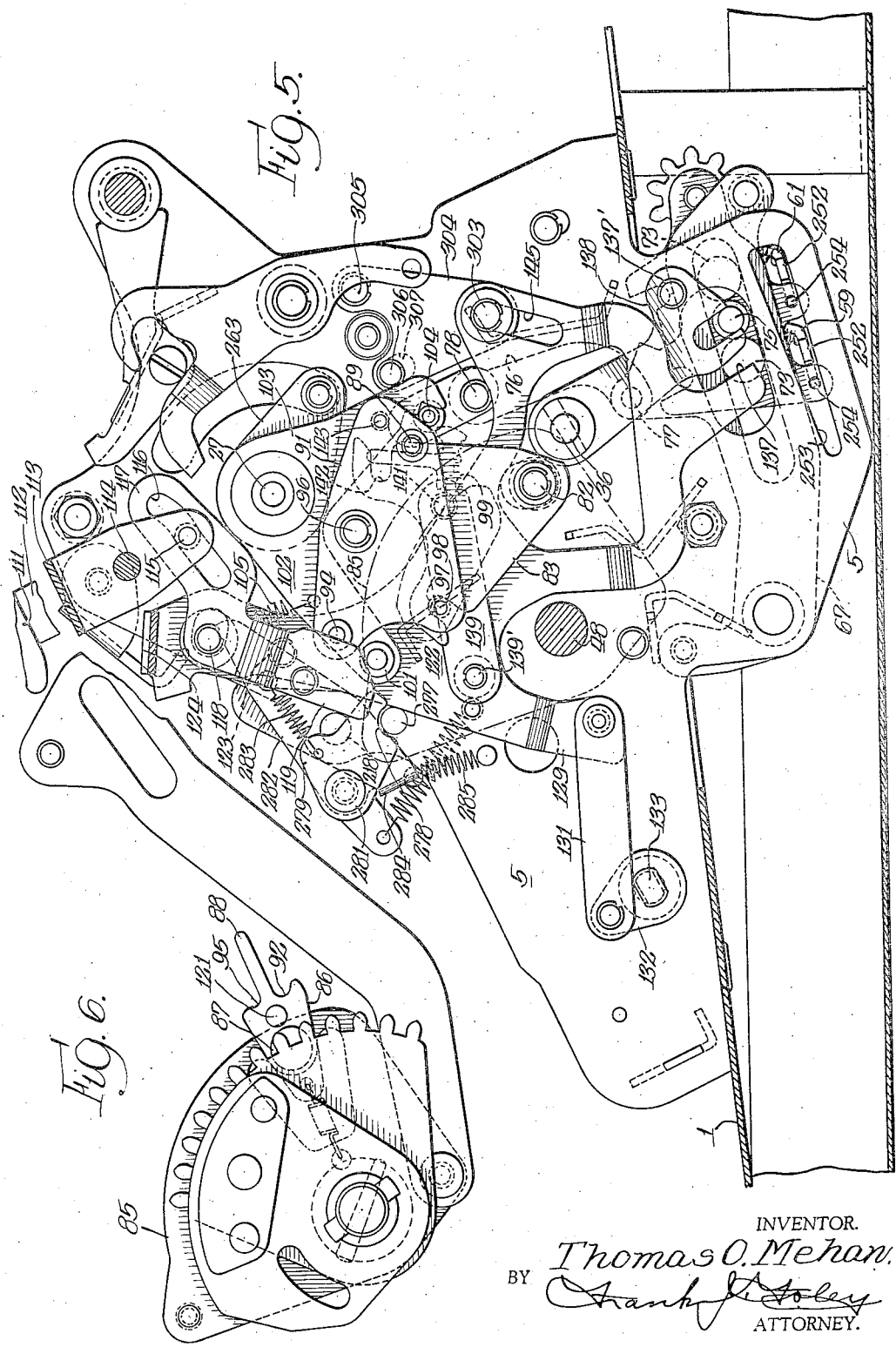

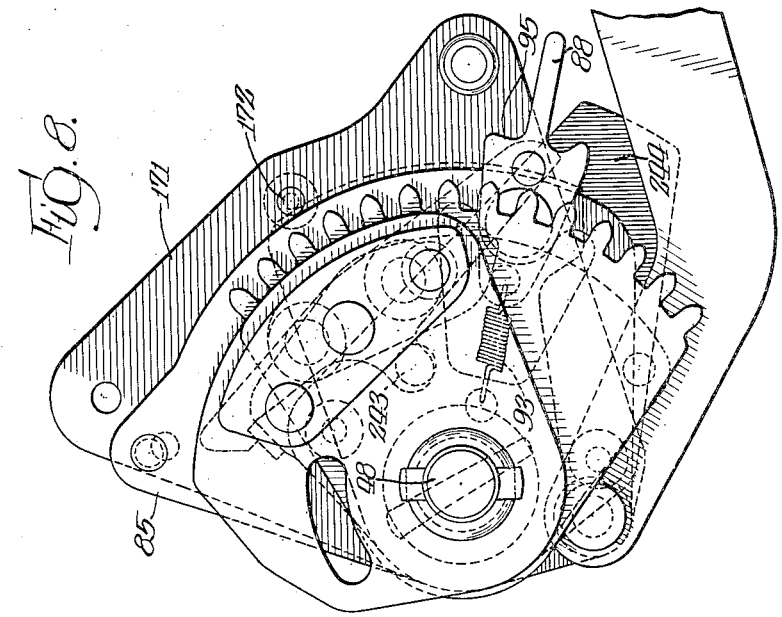
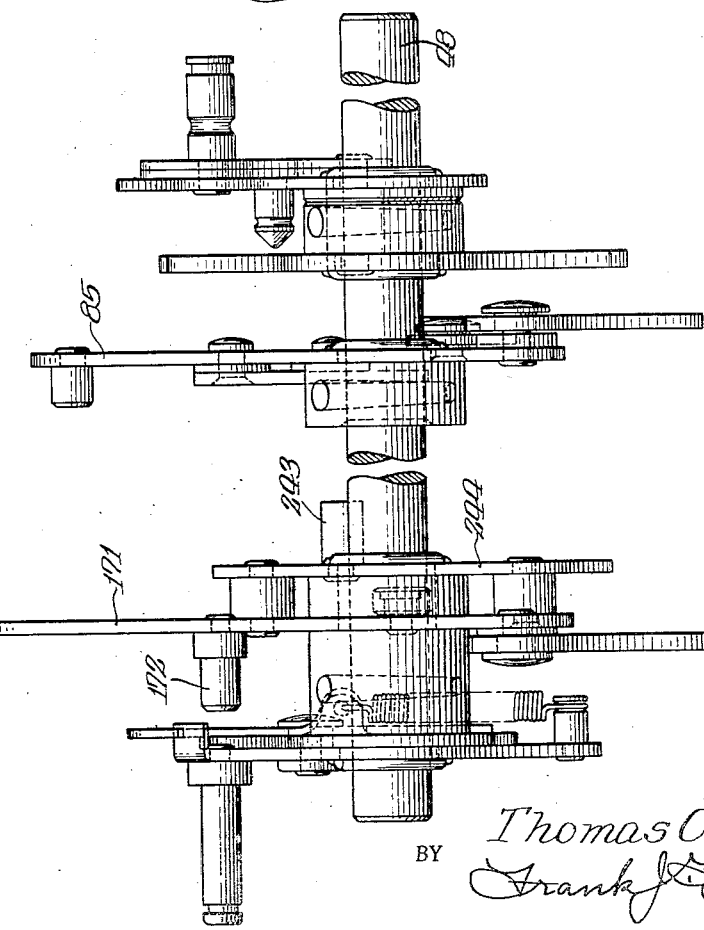

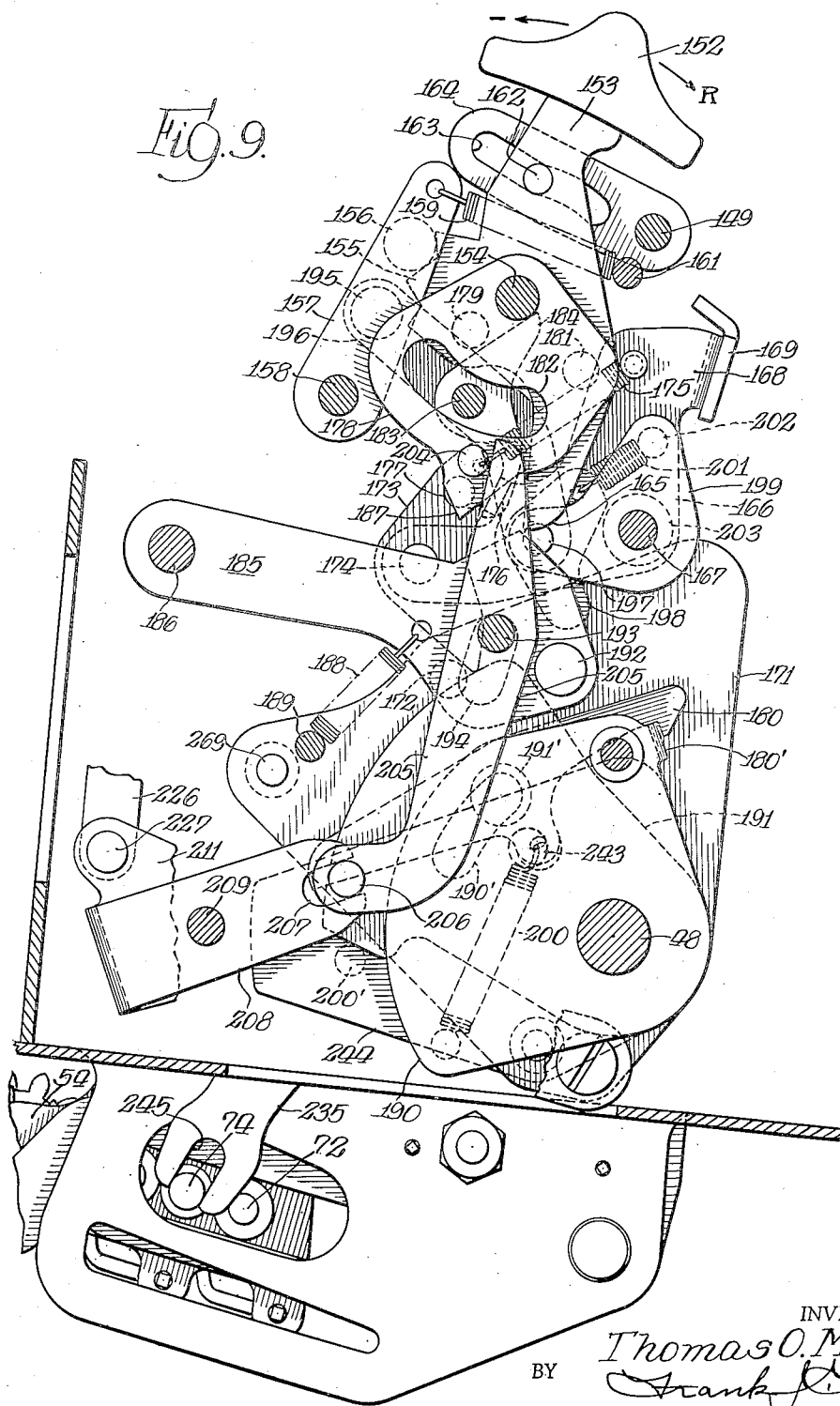

INVENTOR.
Thomas O. Mehan,
BY Frank J. Foley atty.

Nov. 12, 1946. T. O. MEHAN 2,411,050
CALCULATING MACHINE
Filed Dec. 23, 1940 10 Sheets-Sheet 9
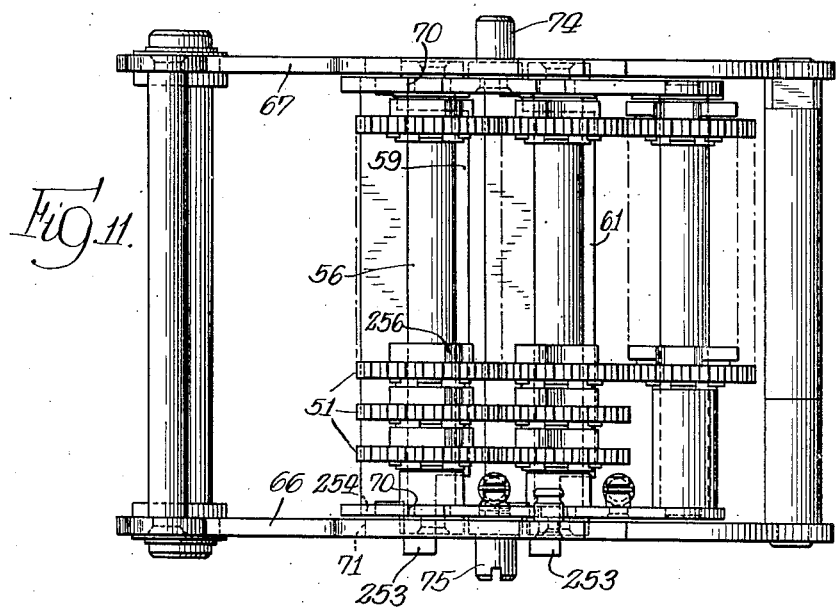
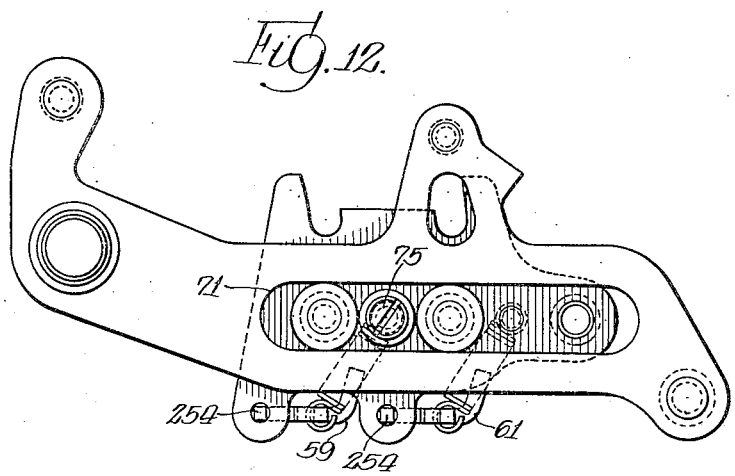
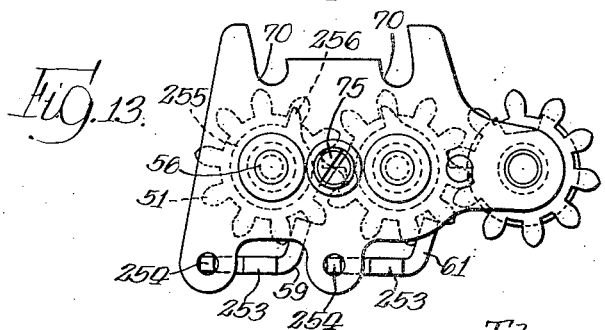
INVENTOR.
Thomas O. Mehan
BY Frank J. Foley
atty.

Nov. 12, 1946.
T. O. MEHAN
2,411,050
CALCULATING MACHINE
Filed Dec. 23, 1940
10 Sheets-Sheet 10
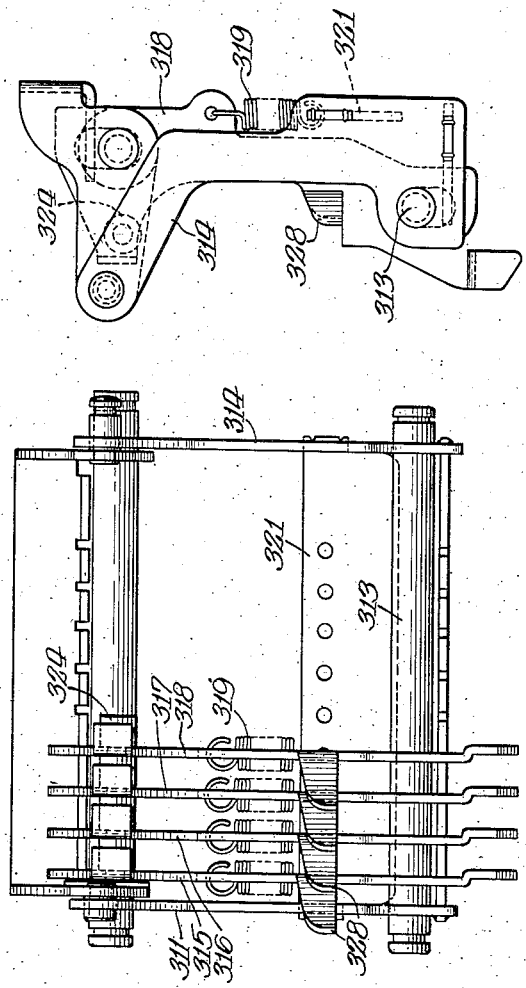
INVENTOR.
Thomas O. Mehan
BY Frank J. ...
Atty.

Patented Nov. 12, 1946

2,411,050

UNITED STATES PATENT OFFICE 2,411,050

CALCULATING MACHINE

Thomas O. Mehan, Chicago, Ill., assignor to Victor Adding Machine Company, Chicago, Ill., a corporation of Illinois Application December 23, 1940, Serial No. 371,366

1 Claim. (Cl. 235—60)

This invention relates generally to improvements in calculating machines and more particularly to adding and subtracting mechanisms for use in such machines.

The general object of the invention is to provide adding and subtracting mechanisms designed particularly for compact arrangement in portable calculating machines.

Other objects and advantages of the machine will be mentioned hereinafter or will become apparent from a perusal of the specification and drawings, wherein a preferred form of the invention has been illustrated and described.

Fig. 1 is a front elevation of a partial assembly of the adding and subtracting mechanisms hereinafter described.

Fig. 2 is a vertical sectional view substantially on the plane of the broken line 2—2 of Fig. 1.

Fig. 3 is a vertical sectional view substantially on the plane of the line 2—2 of Fig. 1, looking in a direction opposite to that on which Fig. 2 is taken.

Fig. 4 is a side elevation taken at the left side of Fig. 1.

Fig. 5 is a side elevation taken from the right side of Fig. 1.

Fig. 6 is a side elevation of a few elements normally mounted on the main shaft in the foreground of Fig. 5.

Fig. 7 is a front elevation of the main shaft assembly.

Fig. 8 is a right elevation of the same assembly.

Fig. 9 is a partial side elevation of the left side of the machine, emphasizing the subtractor key and associated mechanisms.

Fig. 11 is a plan view of the accumulator swinging frame assembly.

Fig. 12 is a side elevation of the same assembly.

Fig. 13 is a side elevation of the shiftable accumulator assembly itself.

Fig. 14 is a front elevation of the zero eliminator assembly.

Fig. 15 is a side elevation of the same assembly.

Figure 10:
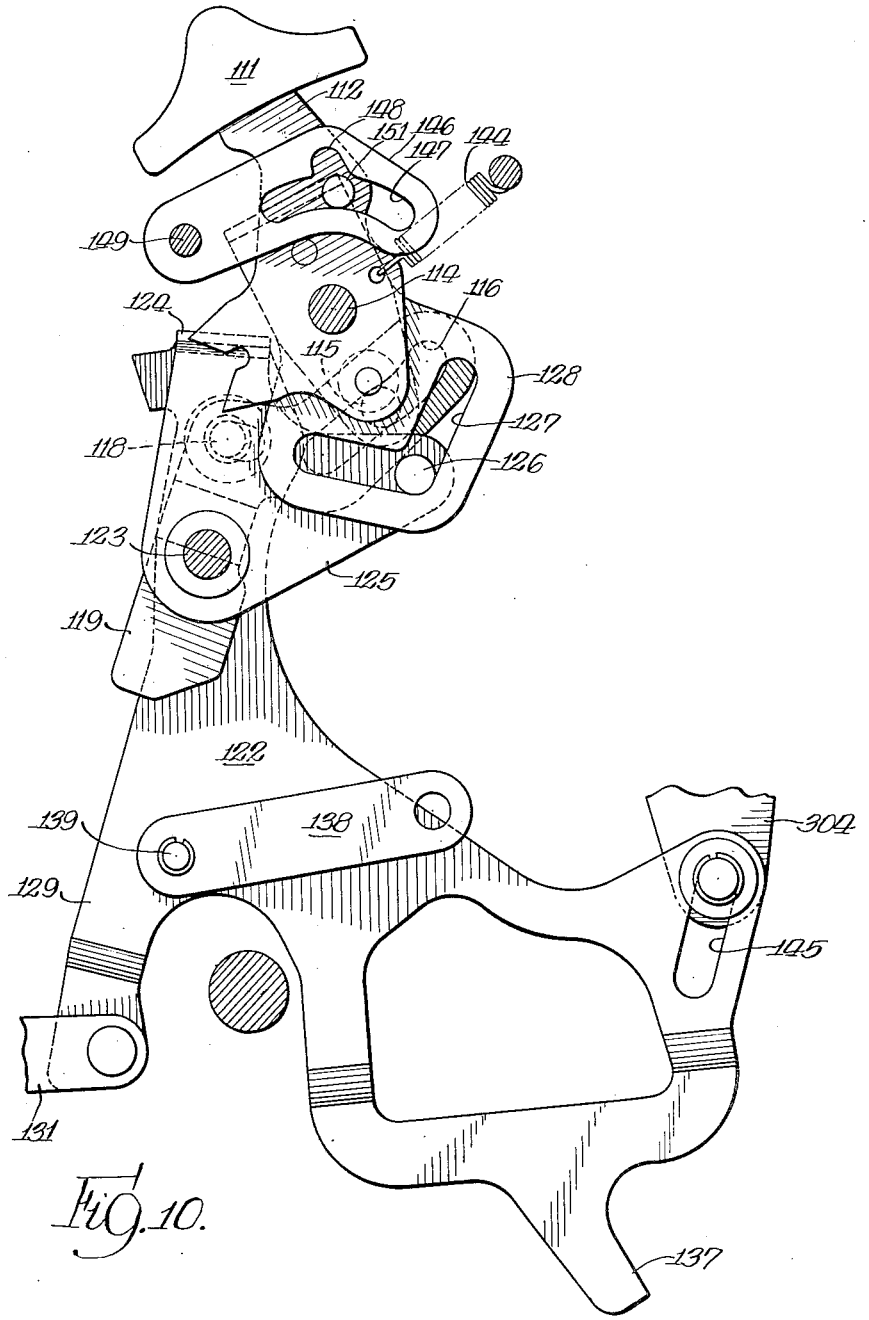
Fig. 10 is an assembly view in elevation taken from the right side of the machine, emphasizing the total key and associated mechanism controlled thereby.

Inasmuch as this application is not concerned with the keyboard unit, the details of that complete unit and the frame for supporting it are not shown in this application. The keyboard unit which is preferably used with the present invention is that which is shown in my co-pending application, Serial No. 282,787, filed July 4, 1939. Likewise, a ribbon mechanism suitable for use with this machine is also shown in the same co-pending application. As this invention is particularly concerned with that part of the machine which performs the addition and subtraction, subject to the control of the keyboard unit, only so much of the machine as is necessary for the understanding of the present invention is disclosed herein.

*Frame*

The frame employed with the present invention comprises a base plate 1 on which are mounted a pair of outside vertical frame plates 2 and 3 and a pair of intermediate vertical frame plates 4 and 5. Preferably, a plurality of projections such as 6 on the vertical plates will extend through corresponding slots in the base plate and will be swaged over to lock the frame plates together.

The keyboard unit fully described in the above mentioned application, is shown in part in Fig. 2 in order that its operative relation to the present invention may be clearly understood.

The outside vertical frame plates are employed not only in supporting the keyboard unit, but also in furnishing the pivotal support for the total key and for the repeat and subtracting keys, and in addition thereto, the support for the ribbon mechanism, as will be better understood by reference to the above mentioned co-pending application.

The full stroke mechanism preferably employed in connection with the present invention is that which is shown in my aforesaid application, Serial No. 282,787.

*Printing mechanism*

Controlled in their rearward travel by the key stems such as 7 are the stop slides 8, one for each bank of numeral keys. A comb 9, mounted on the cross channel member 11 spaces and guides the set of stop slides. Each slide is normally urged rearwardly by a coil spring 12 connected to the comb at any suitable point on the slide.

Laterally extending projections such as 13, suitably spaced, are provided on each stop slide to engage any key stem which may be depressed whereby the corresponding number may be printed by the machine.

Rigidly connected with each stop slide, and offset to an appropriate extent for each bank, as shown in my aforesaid application, is a bracket 14 pivotally connected with a rack bar such as 15. The rack bars are spaced and guided by combs 16 and 17 rigidly supported in any suitable manner by the frame, and are further guided by the rods 18 and 19 which extend through the slots 21 and 22, and are urged rearwardly by springs 12.

As shown in Fig. 2, each rack bar is provided with a set of lower rack teeth 23 and an upper set 24. The upper set engages teeth 25 provided on the type carrying wheel 26 which is rotatably supported on a shaft 27 carried between the intermediate frames of the machine. Each type carrying wheel is provided with a set of numeral types for printing the digits zero to nine, and preferably each set of type will be a single unit 28 secured by welding, riveting, or otherwise to the wheel. Also, each type wheel is provided with a set of teeth such as 29 which may be engaged by a bar 31 on the rectifier bail 32 for holding the type characters in proper alignment during a printing operation. The operation of the rectifier bail is the same as described in my aforesaid co-pending application.

It will be understood that it is preferred to use a swingable platen roll for pressing the paper against the type characters. This platen may be mounted oscillatably upon the shaft 33 and rocked forwardly and downwardly to bear against the type characters in the plane of the comb 34, which is located at the printing plane.

As in the case of the machine described in my prior application, the rack bars on any printing operation are enabled to move rearwardly in accordance with the setting of the numeral keys and their coaction with the lateral projections on the stop slides 8.

Cooperating with the lower teeth on each rack bar is an adding sector designated by its teeth 35, and which is mounted rotatably on a shaft 36. Each adding sector is mounted coaxially with and connected through a lost motion mechanism to an associated accumulator sector 37, having teeth 38.

Fixed on the same bushing 39 to rotate about shaft 36 integrally with each adding sector 35 is a member 41 having an offset ear 42 extending through a slot 43 provided in the associated accumulator sector 37 and aligned so that it may strike the straight edge margin of that slot. Each member 41 also has an ear 44 to which is connected a spring 45 extending through a slot 46 in the associated accumulator sector, the other end of the spring being anchored at 47 on the accumulator sector. Thus the initial rearward travel of the rack bar will first rotate the adding sector 35 and member 41 until the ear 42 strikes the end of the slot 43, after which the sector 35 and sector 37 will rotate together.

Accumulator mechanism

In an ordinary adding operation after the desired numeral keys in the keyboard have been set, the main operating shaft 48 is rotated by the handle or by any other suitable power means, whereupon the stop slides in the associated rack bars will begin to move rearwardly, except whenever held stationary by the zero stops in banks where no numeral keys have been set. Each associated type wheel will be rotated by the upper rack teeth to the proper position to print the numeral corresponding to the key depressed in the associated bank. At the same time, the lower rack bar teeth will rotate first the adding sector 35 and then the accumulator sector 37. When the full forward stroke of the handle has been completed, all of the type wheels will be in position to print their respective numerals and will be temporarily locked in position by the rectifier bail 32. As soon as the return stroke begins, the accumulator mechanism is brought into operative relation with the accumulator sector 37 in a manner which will now be described.

The accumulator gears 51 and 52, and the zero eliminator gears 53 are mounted in a sliding carriage formed of a pair of side plates 54 and 55, which support between them the shafts 56, 57, and 58 on which the gears are individually mounted. Also carried by the side plates 54 and 55 are the accumulator locking plates 59 and 61, projections on these plates extending into suitable apertures in the side plates forming the hinges on which these plates may rotate to locking or unlocking position. Each locking plate is provided with a spring such as 62 and 63, as shown in Fig. 3, for holding the plate engaged with the teeth of the accumulator gears whenever the accumulator carriage is in its lower inoperative position. These springs are connected with the plates and anchored on the posts 64 and 65 which are likewise carried on the carriage side plates.

The accumulator carriage is adapted to occupy a rearward position during adding and total-taking operations and to be slid forwardly for subtracting operations. Accordingly, it is reciprocably mounted in a swinging accumulator frame comprising a pair of arms 66 and 67 secured to a shaft 68 rotatably supported by the lowermost extensions of the intermediate frame plates 4 and 5. The forward end of each of these arms has an upward extension whose function will later be described. The rearward portions of the swinging frame arms are provided with the longitudinal slots 69 and 71 providing slideways for bosses 72 and 73 provided on the accumulator carriage plates 54 and 55. Each of the carriage plates is also provided with a laterally projecting post such as 74 and 75 by means of which the carriage is reciprocated in the subtracting operation.

For raising and lowering the accumulator swinging frame, a link 76 is pivotally connected to a post 77 provided on an upwardly extending portion of the accumulator swinging frame arm 67, and the upper end of the link is pivotally connected with a post 78 carried by arm 79 fixed on the rock shaft 81 carried between the intermediate frame plates, this latter arm being connected by the pin 82 to the accumulator selector 83, this pin being rigidly secured to the arm 79 and extending through a slot 84 in the intermediate frame plate 5.

As shown in Fig. 13 and Fig. 2, the side plates of the accumulator carriage are provided with locking slots 70, either of which will engage with the pin 80 on the adjoining stationary intermediate frame plate of the machine when the accumulator carriage is raised at adding position or subtracting position.

Accumulator carriage shifting

In brief, the three sets of accumulator gears are utilized as follows: Those on the shaft 56 are lifted into engagement with the accumulator sector 37 at the beginning of the return stroke in an adding operation, and lowered out of engagement at the end of the return stroke of the operating handle. In a total-taking operation, the accumulator gears on the shaft 56 are lifted into engagement with the accumulator sector at the beginning of the forward stroke of the operating handle and lowered out of engagement at the beginning of the return stroke. In a sub-total-taking operation, the same accumulator gears are lifted into engagement with the accumulator sector at the beginning of the forward stroke and held in engagement until the end of the return stroke, whereupon they are lowered.

For a subtracting operation, the accumulator carriage is reciprocated forwardly during the forward stroke of the handle and thereafter the accumulator gears on the shaft 57 are lifted into engagement with the accumulator sector 37 at the beginning of the return stroke and dropped out of engagement at the conclusion of the return stroke. If the next operation is an adding operation, the accumulator carriage will be automatically returned to its rearward position during the forward stroke of the handle, but if the next operation should be a total or a subtotal-taking operation, the rotation of the total key to either of those two positions will of itself instantly return the accumulator carriage to its rearward position. However, if two successive subtraction operations are performed, the carriage will remain in the forward position for the second operation if the subtraction key has again been actuated for that operation.

*Accumulator selector mechanism*

In this machine which performs both additions and subtractions, I preferably employ the same accumulator selector mechanism which I have shown in my co-pending application, Serial No. 282,787, which has been referred to above. So far as adding and total-taking operations are concerned, this mechanism is actuated by an operating plate 85 fixed on the main operating shaft 48 and carrying an accumulator control pawl 86 pivotally carried by the plate on a pin 87. The operating plate 85 and the control pawl carried thereby are shown in Fig. 8, while the position of the operating plate when at rest is shown in dotted lines in Fig. 5. When the machine is at rest the tongue 88 on the control pawl rests against the left side of the post 89 fixed on the accumulator selector plate 91. When the operating shaft is rotated on the forward stroke of the handle, the righthand notch 92 in the accumulator selector pawl passes underneath the post 89 without pushing against the same, and as it moves beyond that position, the spring 93 attached to the control pawl tends to rotate the pawl in the direction shown in the assembly view of Fig. 8. When the forward stroke has been completed, the left side of the tongue 88 on the pawl is then resting underneath the post 94 at the forward end of the accumulator selector plate 91. When the return stroke begins, the lefthand notch 95 in the control pawl will then engage the post 94 and lift it, thereby rocking the accumulator selector plate about its pivot 96 in a clockwise direction as viewed in Fig. 5. At this time, inasmuch as the notch 97 in the left side of the accumulator selector is engaged with a post 98 carried by the accumulator selector plate, the rotation of the latter plate will lift the accumulator selector 83, whereupon the accumulator swinging frame will be raised through the cooperation of the post 82 which connects selector 83 with arm 79 (Fig. 3) and the link 76 connected at 77 to the swinging frame arm 67. This brings the accumulators on shaft 56 into engagement with the adding sector teeth 38. Thereby, when the return stroke is taking place, the various adding sectors which have been rotated from zero position during the forward stroke, will rotate their associated accumulator gears 51 an equal amount as the adding sectors return to zero.

In order to make certain that the accumulator swinging frame is positively held in its lower position during the forward stroke and is held in its upper position positively during the return stroke, there is provided a cam 99 shown in dotted lines in Fig. 5 which will be rotated during the forward stroke underneath a cam follower 101 and remain in engagement with said cam follower almost to the end of the forward stroke. The cam follower is carried on one arm 102 of a bell crank, whose other arm 103 is provided with a pair of notches as shown to engage a post 104 on the upwardly extending portion of the rear end of the arm 79 a short distance above the link pivot 78. The accumulator locking bell crank, consisting of the arms 101 and 103, is held resiliently against the post 104 by means of the spring 105. Whenever the accumulator swinging frame has been lifted by means of the accumulator selector 83 as described above in connection with an adding operation, or otherwise, the upper notch on the bell crank will hold the accumulators in the upper engaged position. When the return stroke is just being completed, the lower rear end of the cam plate 99 is positioned so that it strikes against the post 82 fixed on the arm 79, and as it moves further to the completion of the return stroke, it forces the accumulator frame down to its inoperative position, the yielding mounting of the locking arm 103 permitting this to occur. This arm is pivoted on the shaft 27 so that it may rock the slight amount necessary.

The foregoing description of the operation of the accumulator selector mechanism applies to an adding operation. So far as the lifting of the accumulator frame is concerned, the same description will apply to a subtracting operation.

The functioning of this selector mechanism in a total key operation will now be described in connection with the description of the total key mechanism.

*Total key operation*

The locking mechanism employed for locking the total key either in neutral, in total, or in subtotal position is the same as that shown in my co-pending application Serial No. 282,787, above mentioned, and therefore will not be described herein. Also, for the same reason, the mechanism by which the total key, when rotated either to total or sub-total position, clears the keyboard, likewise will not be described here.

While it will be recognized that in principle and in construction there is considerable identity between the total key mechanism shown in my application 282,787 and that shown herein, a description of the remainder of the mechanism will be required herein because of its relation to the different accumulator mechanism which this specification discloses.

The total key 111, shown in neutral position in Figs. 5 and 10, from which it is rotatable forwardly to total position or rearwardly to sub-total position, is attached to a stem 112 secured to a bail 113 pivoted at 114. The lower end of one leg of the bail 113 carries a post 115 extending through a slot 116 of a bell crank arm 117 pivoted at 118. When the total key is rotated to sub-total position the post 115 acting on slot 116 will rotate the bell crank counter-clockwise, as viewed in Fig. 5, to place the lowermost edge of the bell crank arm 119 in position to be engaged by a short post 121 on the side of the accumulator selector control pawl 86 as the forward stroke is being completed, whereby on the return stroke the left notch 95 of the pawl will be held down out of engagement with post 94 of the accumulator selector plate 85. If the notch 95 were permitted to engage and lift the post 94 at this time on the return stroke, the accumulator plate 85 would be rocked clockwise, causing the selector 83 to be lowered, which would thereby cause the accumulators to drop down at the beginning of the return stroke, as is done in a total taking operation.

Describing further the sub-total operation, the total key is rotated rearwardly either before or after the numeral keys have been set in the keyboard, whereupon the rotation of the key to sub-total position will rock the total control lever, generally indicated as 122 in Figs. 5 and 10 about the axis 123. The total control lever proper, designated 122, has its upper end formed as the left leg of a bail 124 pivoted at 123, the right and shorter leg of the bail having a rearward extension 125 carrying a post 126 positioned to slide in a V-shaped slot 127 formed in one leg of the total key bail 113, this leg being designated as 128, being riveted or otherwise secured directly to the key stem 112 and pivoting about the shaft 116. The action of the slot 127 on the post 126, whether the rotation be to sub-total or total position, has the effect of rotating the total control lever 122 in a counter-clockwise direction as viewed in Fig. 5 and Fig. 10. At the same time, the keyboard will be cleared and locked against further operation, but the mechanism for that purpose is the same as is described in my co-pending application 282,787.

Referring further to the total control lever, the forward leg 129 of this lever is connected by link 131 to an arm 132 secured on a rock shaft 133 which serves the purpose of releasing the zero stop 134 (see Fig. 2) which, except in a totalizing operation, engages the ear 130 on the rack bar to the extreme left in the bank of rack bars, this zero stop being pivoted at 135 and held normally engaged by a spring 136. When thus released this rack bar, not associated with any stop slide or key bank, will be drawn rearwardly by its spring 140 to the extent determined by the sum, if any, accumulated in its associated accumulator by tens transfers from the highest key bank on its right, and thus its type wheel may print such sum.

If the accumulator carriage is in subtraction position, the rotation of the total control lever will cause finger 137 at the bottom thereof to push rearwardly on the post 137' fixed on the pivoted arm 138. This arm pivots on shaft 36, and the slot in its lower end, engaging the post 75 on the accumulator carriage, will thereby slide the carriage rearwardly to total position.

A further and primary function of the shifting of the control lever is to cause the link 139, pivotally connecting post 139' on the control lever and post 141 on the accumulator selector 83, to cause the selector to rotate rearwardly whereby the notch 142 on the selector will engage the post 143 on the accumulator selector plate 91 and rotate the latter a small amount in a clockwise direction, as Fig. 5 is viewed. Thereafter, when the forward stroke begins, the forward rotation of the operating plate 85, which carries the selector pawl 86, will cause the right-hand notch of the pawl to engage the post 89 and lift upon it to lift the selector 83 and thereby post 82, the arm 79, link 76, and the accumulator swinging frame (Fig. 3) immediately at the beginning of the forward stroke. This brings the accumulators on shaft 56 into engagement with their associated adding sectors 37, whereby the rotation of each accumulator toward its zero position by the action of the spring-propelled rack bars during the forward stroke will allow a corresponding rotation of the type wheels and cause the printing type wheels to print the amount therein registered at the end of the forward stroke.

As just explained above, the rotation of the total key to sub-total position has also swung the lever 119 rearwardly, so that it will prevent the accumulator lock arm 103 from releasing the accumulators at the beginning of the return stroke. Accordingly, the accumulators remain in engagement with the adding sectors to the end of the return stroke and thereby re-accumulate the sums which they previously contained.

The total key is always returned to neutral position by a spring 144 connected directly to the total key, and the accumulators will be forced out of engagement with the adding sectors just at the end of the return stroke by the bumping of the lower end of the cam 99 against the post 82, as explained above in connection with an ordinary adding operation.

The function of the slot 145 provided in the total control lever will be described later in the description of the zero eliminators.

For a total-taking operation, the total key is rotated forwardly. The movement of the V-shaped slot 127 acting on post 126 will rotate the bail 124, causing the total control lever 122 to rotate counter-clockwise just as in the sub-total operation. However, the post 115 will move through the slot 116 in the bell crank arm 117 without causing the arm 119 to rotate, as it does in a sub-total operation. The rotation of the total control lever causes the link 139 to throw the accumulator selector 83 to the right, as viewed in Fig. 5, engaging the notch 142 with the post 143. Therefore, at the beginning of the forward stroke, the accumulators on the shaft 56 will engage the adding sectors. During the forward stroke each of the accumulators will be rotated back to zero by the adding sectors, and their total will be printed at the end of the forward stroke when the rockable platen is brought into engagement with the type wheels.

In view of the fact that the arm 119 has not been rotated by the total key, the accumulator control pawl will strike the post 94 at the beginning of the return stroke to thereby raise it and rotate the accumulator selector plate 91 clockwise, thereby lowering and releasing the accumulators. Thus, the accumulators, having been restored to zero on the forward stroke, will not be disturbed during the return stroke.

The arm 146 shown in Fig. 10 having a curved slot 147 and a central notch 148, is provided for the purpose of locking the total key against operation while the subtraction key is in subtracting position. Accordingly, this arm 146 is fixed on a shaft 149 and is positively rotated downwardly by the operation of the subtraction key to bring the notch 148 into engagement with a post 151 extending from the side of the key stem plate 112.

Subtraction and repeat key

The key 152 fixed on the key stem 153 serves as a repeat key when rocked forwardly, as in the aforesaid application Serial No. 282,787, and when rocked rearwardly it sets up the mechanism for a subtraction operation. The key is pivoted at 154 and is provided with the notched projection 155 shown in Fig. 9 which cooperates with the follower 156 on the arm 157 to hold the key in neutral, forward, or rearward position, the arm being pivoted at 158 and being urged toward the key by the spring 159 anchored at 161. Whenever the key is rocked to subtract position a pin 162 travelling in slot 163 in arm 164, fixed on shaft 149, will lock the total key in neutral, as previously explained.

The key 152 has a depending leg or finger 165 whose function is to prevent the release of keys which have been set in the keyboard when it is desired to repeat the addition of a sum set up therein. A plate 166, shown wholly in dotted lines in Fig. 9, and pivoted at 167, is secured at its forward upper end 168 to a bar 169 which extends across the machine in position to strike all of the key lock slides thereby releasing the set key stems, if the repeat key is not in repeat position. A plate 171, mounted on the main operating shaft 48 to rotate in unison therewith, carries a post 172 which will operate the keyboard clearing bar on the return stroke, normally. A dog 173 pivotally carried at 174 on the rear extremity of plate 166 is normally held by a spring 175 so that its upper end rests against a laterally projecting ear 176 on the plate 166. When the plate 171 rotates forwardly with shaft 48 the post 172 strikes but passes under the lower end of the spring held dog 173, but on the return stroke the dog is struck again and since it bears against the ear 176 the dog and plate 166 are rotated about the pivot 167 to release the keyboard.

However, if the repeat key had been rotated forwardly, the finger 165 at its lower end would have engaged the post 177 on the side of dog 173 and rotated the latter so far counter-clockwise (Fig. 9) that the dog would entirely clear the post 172, thus avoiding any release of the keyboard.

A plate 178 is secured rigidly to the key stem 153 in spaced relation by posts 179 and 181. A curved slot 182 in plate 178 is provided so that the plate may rotate relatively to a post 183 mounted on the adjoining vertical frame member and pivotally carrying a dog 184 whose upper end will be engaged by the post 179 when the key is rotated to subtraction position, thereby rotating the lower end of the dog clockwise (Fig. 9). As the dog is thus rotated, its lower end will strike the post 177 on the side of the dog 173 and will rotate the latter out of the path of the post 172 on the plate 171. Hence, if the operator desires to repeat a subtraction and will hold the subtraction key so that it will not be released at the end of the return stroke, the keyboard will not be cleared. If the subtraction key were allowed to be returned automatically to neutral position during the return stroke, the keyboard would be cleared.

The key 152, if in neutral position at the time the forward stroke begins, will be locked against rotation to the subtraction position, or if in subtraction position at the beginning of the forward stroke, will be locked against rotation therefrom by means of a locking arm 185 pivoted at 186 which cooperates with the projection 187 on the bottom of the plate 178. The spring 188, anchored on a post 189 supported by the adjoining side frame plate, normally holds this locking arm in lowered inoperative position, but as the main shaft 48 rotates forwardly, the cam plate 191 will strike a follower 192 carried on the side of the locking arm to thereby raise the locking arm into engagement with projection 187 during the completion of the forward stroke and until near the end of the return stroke, as the follower rides over the periphery of the cam. A post 193 extending through the slot 194 in the locking arm and having an enlarged head bearing against the face of the locking arm is provided to guide the locking arm in its oscillatory movement.

The key 152, unless held in subtraction position by the operator, is automatically returned to neutral during the return stroke in the following manner: The arm 157 whose follower 156 engages the notched edge of the key stem to hold it releasably in either of its three positions has connected with it at the pivot 195 a link 196, whose other end is connected to the pivot 197 of a dog 198 pivotally carried on a rocking plate 199 rockably mounted on the fixed post 167. A spring 201, connected with the dog as shown and anchored on the post 202, likewise carried on the plate 199, normally urges the dog in the direction indicated in Fig. 9. Hence, during a forward stroke, the post 172 will rotate the dog 198 against the action of its spring and pass thereunder without pushing on the link 196. But on the return stroke of the plate 171 and post 172, the latter will strike the lower end of the dog 198 and lift it, since its upper end bears against the sleeve 203 surrounding the post 167. This lifting of the dog pushes on the link 196 and releases the follower 156, whereupon the key stem is restored to normal by the action of the spring 175 causing the pin 177 to bear against the lower end of the dog 184, whose upper end pushing against post 179 will restore the key to normal or neutral position.

At the same time, as the key 152 rotates to neutral position, the lower end of dog 173 will drop down into its normal position in time to be engaged by the post 172 on cam 171 and causing the release of the keyboard as the plate 168 is rotated clockwise.

On the forward stroke, cam 191, which is rotatably mounted on shaft 48, is pulled forwardly by a latch 180 engaged with an ear 180' on a plate 190 which is fixed on the shaft. The latch is pivoted at 191' on a post carried by cam 191 and extending through slot 190' in the fixed plate 190. The spring 209 is connected as shown with the latch and anchored on the fixed plate so that when the parts are at rest, the cam rests against the stationary post 200'. During the forward stroke, the rear end of the latch 180 will strike the pin 192 on the key locking arm 185, thereby releasing the latch, whereupon the spring 209 will draw the cam 191 rearwardly to the extent permitted by the travel of the pivot post 191' in the slot 190'. However, the key locking arm will still be held up by the cam 191 during the remainder of the forward stroke.

On the return stroke, in view of the fact that cam 191 has been withdrawn rearwardly by spring 209, the cam follower 192 on the key locking arm will ride off the edge of the cam sooner than if the cam had not been retracted. This release of the key locking arm is thus timed in such a manner that as the locking arm drops down, the subtraction key may be restored to normal during the remainder of the return stroke, as just above described.

A further result of the rotation of the key to subtraction position is noted in the action of a post 204, which is fixed on the plate 178, as it strikes the upper end of the vertical lever 205 pivoted on the side frame at 193. The clockwise rotation of this lever causes the pin 206, carried in its lowered end and engaging the U-shaped slot 207, to rotate the bail arm 208 pivoted at 209 in a counter-clockwise direction (Fig. 9). The other arm 211 of the bail has a bifurcated or slotted end which engages a pin 212 on a bell crank generally indicated as 213 pivoted at 214, and whose other arm 215 is likewise bifurcated to engage the pin 216 in the lower end of an arm 217 fixed on a rock shaft 218 (Figs. 4 and 9). As shown in Fig. 3, the rock shaft 218 being thus rotated in a counter-clockwise direction (Fig. 4) will cause another arm 219 fixed on the same rock shaft to press downwardly in the slot 221 in the plate 222 by means of its post 220.

This movement of the arm 219 in a counter-clockwise direction pulls downwardly on plate 222, which has a central slot surrounding the type wheel shaft 27, and the slot 223 in this plate will act on pin 224 to rotate the signal type wheel 225 (Fig. 3) counter-clockwise a sufficient distance to bring the minus sign type to the printing position, to indicate that a sum has been subtracted in the operation. At this point it may be stated that the rock shaft 218 does not move when the total key is operated to sub-total or total position, and although the signal type wheel is rotated, the pin 229 in the slot 221 will not interfere with the movement of the signal type wheel and the plate 222 which moves along with it.

It has been explained above how the operation of the total key will positively return the accumulator carriage to normal total-taking (or adding) position if the carriage should happen to be in subtraction position when a total is next desired, that is the finger 137 (Figs. 6 and 10) will thrust against post 137'.

It will now be explained how the carriage is shifted to subtraction position. When key 152 is rotated rearwardly, the post 204 rotating integrally with it rocks arm 205 and the bail having arms 208 and 211, as previously explained. As the bail rotates counter-clockwise (Figs. 9 and 4) about its axis 209, the link 226 pivotally connected at 227 to the bail will be pulled downwardly, guided by its slot 228 on the pin 229. The laterally extending post 231 carried by the link will push down the rear end 232 of the arm generally indicated as 233 pivotally carried at 234 on the accumulator carriage shifter arm 235, which itself is pivotally supported at 236. The extent of the movement of the arm 233 is such as to rotate it high enough that the upstanding projection 237 on the arm may be engaged by the post 238 as the latter is rotated rearwardly during the forward stroke of the machine. The post 238 is fixed on one end of a lever 239 pivoted on the frame at 241 and having an open ended slot 242 which is constantly engaged by a post 243 fixed on the side of a cam plate 244 mounted on shaft 48 and rotating therewith. As shown in Fig. 4 the shifter arm 235 has a slot 245 in its lowered end and which is constantly engaged with a pin 74 fixed on the left side of the accumulator carriage. Consequently, when the key 152 has been rotated to subtraction position and the arm 233 rocked upwardly and the forward stroke thereafter initiated, post 238 will push against the shoulder 237 to thereby push arm 233 bodily rearwardly, rocking the shifter arm 235 about its pivot 236, thus throwing the accumulator carriage to the forward subtraction position. If the key is not manually held in subtraction position, it will be automatically released, as heretofore explained, on the return stroke, which will leave the arm 233 and shifter arm 235 in the position shown in dotted lines in Fig. 4. When the subtraction key is restored to neutral the link 226 and the bail to which it is connected will be restored to the position shown in Fig. 4.

If the key 152 is still held in subtraction position or is restored thereto while the carriage is still in subtraction position, the downward movement of the link 226 will rock the arm 233 counter-clockwise so that the hook 246 will be raised above the path of travel of post 243 during the forward stroke. However, if the key is in neutral position, the post 243 will engage this hook during the forward stroke, pull the link 233 forwardly, rocking the shifter arm 235 clockwise, and thereby restore the carriage to adding or total position before the forward stroke is completed. Thus the accumulators will be automatically restored to position to perform addition if an adding operation follows the subtraction operation. This will leave the parts in the position shown by full lines in Fig. 4. A spring 247 bears against post 248, is wound around the pivot 234 and hooks over the link 233 to urge the latter in a clockwise direction. Thus, the rear end of the arm will bear either against the post 231, or when the carriage is in forward position and the key 152 in neutral position, the post 248 will limit the clockwise rotation of the link. The shifter arm is releasably locked in either position by the arm 249 pivoted at 249' bearing against pin 250 on the shifter arm under the downward pull of spring 251.

Accumulators

Whether the accumulator carriage is in its rearward adding position or in its forward subtraction position, the accumulators when dropped down always are held locked by the locking plates 59 and 61, best shown in Fig. 2. Whenever the accumulators are raised for engagement with the accumulator sector teeth 38, these locking plates will become disengaged from the accumulators when the ears 252 (Fig. 5) strike against the upper margin of the slot 253 in the right-hand intermediate vertical frame plate 5. The pivotal support for the locking plates is shown in Fig. 5 at 254.

In an adding operation, each accumulator on the shaft 56, being engaged with the accumulator sector teeth 38, will be rotated to an extent determined by the rearward travel of the associated rack bar, which in turn moves to the extent determined by the keys in its own bank.

In a total-taking operation the rack bars are released for rearward movement by their springs 12, and the extent to which they may travel will be determined by the associated carrier pawl acting on the carrier cam which is integral with each accumulator wheel. Referring to Figs. 2, 11, and 13, it will be observed that each of the accumulator gears 51 on the shaft 56 carries integrally with it a cam 255 which has a projection 256 for cooperation with the carrier pawl. The carrier pawl itself is shown in Fig. 2 as 257, pivoted for oscillation about a shaft 258, and having a cam follower projection 259 which rides on the carrier cam whenever the accumulators 51 are raised. The spring 261 insures this contact of the pawl and cam. When the accumulator is being rotated toward zero during a total-taking operation, it may continue to rotate until the nose 259 of the carrier pawl strikes the radially extending face of the carrier cam projection 256. This is at the zero position of the accumulator.

Of course, it will be understood that in a subtotal operation after each accumulator has been rotated to zero and stopped by the above described cooperation between its carrier pawl and cam projection 256, the return stroke of the machine, with the accumulators still engaged with the accumulator sectors, will restore each accumulator to the position formerly occupied by it before the sub-total was taken.

The tens transfer is accomplished as follows: During an adding operation the accumulators on the shaft 56 are raised and meshed with the accumulator sector teeth 38 at the beginning of the return stroke. The rack bars having moved rearwardly in accordance with the key setting in their associated banks are restored to their normal forward position by means of the rack restore bail 262. This bail is carried on a pair of arms pivoted on the shaft 27, one of the arms 263 being disposed outside of the right-hand intermediate frame plate, and the other 264 being mounted outside the left-hand intermediate frame plate. The latter arm is provided with a gear sector 265 meshing with another gear sector 266 mounted on the cross shaft 267 and connected in any suitable manner to rotate integrally with the rack restoring cam 268. This mechanism, described in my aforesaid application, is operated by the post 269 mounted on the side of the cam plate 171, the post entering the cam surfaces formed by the bifurcated legs of the rack restore cam and positively restoring the various type wheels and their associated racks to normal position as the bail rod 262 engages the bottom of the curved slot 271 in each type sector wheel during the return stroke.

As the racks are propelled forwardly to their normal position by the bail rod 262, the lower set of rack teeth 23 acting on the accumulator sector teeth 35 will rotate each accumulator sector towards its normal position, which is shown in Fig. 2. But if any accumulator gear 51 shall have during the return stroke of the adding operation rotated past its zero position, the sloping side of the carrier cam projection 256 will have lifted the associated carrier pawl and enabling the latter to become locked in raised position. The mechanism for locking is shown in Fig. 2 consisting of a locking pawl 272 rotatably mounted on shaft 233 and held under tension by spring 261. Should the carrier pawl be rotated to raised position, the shoulder 273 on the carrier pawl will be rotated down far enough to permit the lowermost edge 274 of the locking dog to override the end of the pawl and thus hold the carrier pawl in raised position even after the projection on the carrier cam has passed. Referring to Fig. 2, it will be observed that therefore as the accumulator sectors 37 are being rotated counter-clockwise to their normal positions, the laterally projecting ear 275 on any accumulator sector plate will be able to enter the notch 276 on the carrier pawl to the right of the individual accumulator sector if such pawl to the right has been raised. Thus, after the rack and adding sector have rotated the gear to the extent determined by the key setting in its own associated bank, the spring 45 connecting the adding sector and accumulator sector will rotate the gear one tooth further if the carrier pawl to the right thereof is held locked in raised position. Thus the tens transfer is accomplished.

As the accumulator carriage is dropped down at the end of the return stroke, the cross bar 270 which extends between the accumulator frame arms 66 and 67 will bump against the lower portions of the carrier pawl locking dogs 272 (Fig. 2) and rotate each of them, if previously displaced back to the position shown in Fig. 2. However, if any of the carrier pawls have been lifted, they will still remain raised because of the engagement of the notches 276 with the ears 275.

The carrier pawls are restored to their normal position as follows: Referring to Figs. 2, 3, 6, and 8 it will be observed that the plate 85 fixed on the main operating shaft carries a post 277 which at the normal position lies in a notch 278 in the carrier restore pawl 279. This pawl is pivotally carried at 281 on the plate 282 which in turn is pivoted on the rock shaft 218. The spring 283 connected to the pawl and plate serves to hold the pawl against post 277. The plate 282 whose rearward extremity normally rests against the post 118 constitutes one leg of a bail having a cross bar 284 held downwardly by the spring 285, and whose other leg is the arm 286 pivotally connected at 287 to a link 288 pivotally connecting it at 289 to an ear 291 depending from a carrier restore plate 292 fixed on the rock shaft 293 (Fig. 3). When the plate 85 (Fig. 6) begins to rotate at the beginning of the forward stroke, the post 277 will push against the pivot of the pawl 279 and rock the bail 282—286 in a clockwise direction as seen in Fig. 2 or in a counter-clockwise direction as seen in Fig. 3, causing the carrier restore comb 292 to swing downwardly toward the uppermost teeth 38 of the adjoining accumulator sectors (Fig. 2). If any of these accumulator sectors have rotated one tooth beyond the position shown in Fig. 2, that is whereby their ears 275 have entered a carrier pawl notch 276 in tens transfer position, the carrier restoring comb 292 will push them all back to normal, and the associated springs 261 will restore the carrier pawls to the position shown in Fig. 2. Hence, this machine, as is equally true of the machine described in the above mentioned patent application, does not require an idle stroke between an adding operation and a total-taking operation.

When a subtraction is being performed, the accumulator gears 52 on the shaft 57 are raised into engagement with the accumulator sector teeth 38, and the carrier pawls cooperate with the carrier cam projections 256′ in the same manner as they do in the adding operation just described. If during subtraction, any accumulator on shaft 57 be rotated past its zero position, the carrier pawl which will be thereby raised and locked will enable the accumulator to the left thereof to rotate one tooth further, thereby subtracting ten from the adding accumulator in gear therewith.

The third set of gears 53 on the shaft 58 are provided for the purpose of operating the zero eliminators which will now be described.

*Zero eliminators*

To eliminate the printing of zeros to the left of the first figure which should be printed in any total printed by the machine, that is where the total is less than the full capacity of the machine, zero eliminators as shown in Figs. 14 and 15 and Fig. 2 are provided to cooperate with the third set of accumulator gears on the shaft 58. Each of these accumulators is provided with a cam 301 having a notch 302 which will occupy the position shown in Fig. 2 if the highest figure in the total does not extend into the bank with which any such accumulator is associated. When the total key is operated either to sub-total or total position, the rocking of the total control lever, generally indicated as 122 in Fig. 10, will cause the slot 145 to push rearwardly against a pin 303 mounted on the side of a lever 304 (Fig. 5) pivoted on post 305 and pivotally connected with a post 306 extending through a slot 307 in the intermediate side frame plate. The post 306 constitutes the pivotal connection between the lever 308 (Fig. 3) fixed on the rock shaft 309 and the right-hand side plate 311 of the zero eliminator frame. This plate has a slot 312 surrounding a cross rod 313 which passes through all of the zero eliminators and which is fixed on the side frame members 311 and 314 of the zero eliminator assembly. Accordingly, when the rotation of the total control lever pushes the post 303 rearwardly, causing the post 306 to be pulled downwardly, the assembly frame members 311 and 314 carry the rod 313 downwardly and thereby carry along with them each of the individual eliminators such as 315, 316, 317, and 318, illustrated in Fig. 14. That is, the individual eliminators are pulled downwardly by their individual springs such as 319, which are connected to the plate 321 which extends across the rear of the movable eliminator frame serving as an anchor for the springs. When the forward stroke begins and the accumulator carriage is lifted, the lower ends of the eliminators will contact the eliminator cams 301. Combs 322 and 323 are provided as shown to maintain the spaced alignment of the eliminators.

Each eliminator carries on its upper forward portion a roller 324, and when the eliminators are inoperative, these rollers are positioned slightly above the rear projecting portion 325 of each of the rack bars. Consequently, in adding operations the rack bars may slide underneath the rollers and between the eliminators without interference. But in a total operation when the eliminators are lowered, if any eliminator is not drawn into a zero recess 302 of its associated cam, the rear end 325 of the associated rack will pass under and lift slightly on the roller to prevent any further downward movement of the eliminator.

To the left of the accumulator representing the highest denomination in the total there may be one or more accumulators in zero position, and their associated eliminators will enter the recesses 302 in their cams, and the rollers carried by such eliminators will drop down far enough to positively block any rearward movement of these associated racks. Hence, the associated type wheels cannot rotate out of non-printing position even though they have been released by the key board, and they will therefore not print zeros. When the eliminators have been lowered by the total control lever, any that are able to be pulled downwardly into the cam recesses 302 may do so inasmuch as the slots 326 and 327 in the eliminators permit such movement under the action of the individual springs 319.

However, each eliminator is provided with a projection 328 which extends, as shown in Fig. 14, to the left from the eliminator with which it is integral over a shoulder 329 on the eliminator next to the right thereof. Consequently, if any eliminator be held partially raised by the high portion of its eliminator cam, every eliminator to the right thereof will likewise be held up by the co-action between these projections 328 and the shoulders 329. Hence for example, if the fifth bank from the right contains a sum which should be printed in a total, its eliminator cam will not be in zero position, its eliminator will be held up by the high portion of the cam, and every eliminator to the right will likewise be held up, and the type wheels to the right will print zeros or higher digits in accordance with the total then existing in the machine. Restoration of the total lever to normal position will in an obvious manner restore the eliminators to their inoperative position, which is shown in Fig. 2.

A spacing comb 332, shown in Fig. 2, is provided for spacing the accumulator sectors, and the comb 333 serves to space the ends of the carrier pawls and the locking pawls. Another comb 334, shown in Fig. 2, spaces the type wheels.

While one embodiment of the present invention is herein illustrated and described in considerable detail, it should be understood that the invention is capable of considerable modification without departing from the spirit and scope of the invention defined in the appended claim.

Having shown and described my invention, I claim:

In a calculating machine, a pair of parallel shafts one above the other, type wheels on the upper shaft, accumulator driving gears on the lower shaft, numeral key-controlled means reciprocating between said shafts for driving the type wheels and said gears, sets of three pinion gears intermeshed on three adjacent shafts, one of each set being selectively engageable with the driving gears for addition, a second of each set being engageable with the driving gears for subtraction, and means co-acting with the third of each set of gears in total-taking operations for preventing the printing of zeros to the left of the highest order digit in the total, said pinion gears being arranged for reciprocation in the plane of their axes and in a direction perpendicular to their axes.

THOMAS O. MEHAN.